Sept. 7, 1954   F. B. BERGER ET AL   2,688,743
FREQUENCY TRACKING RADAR
Filed May 29, 1952   3 Sheets-Sheet 2

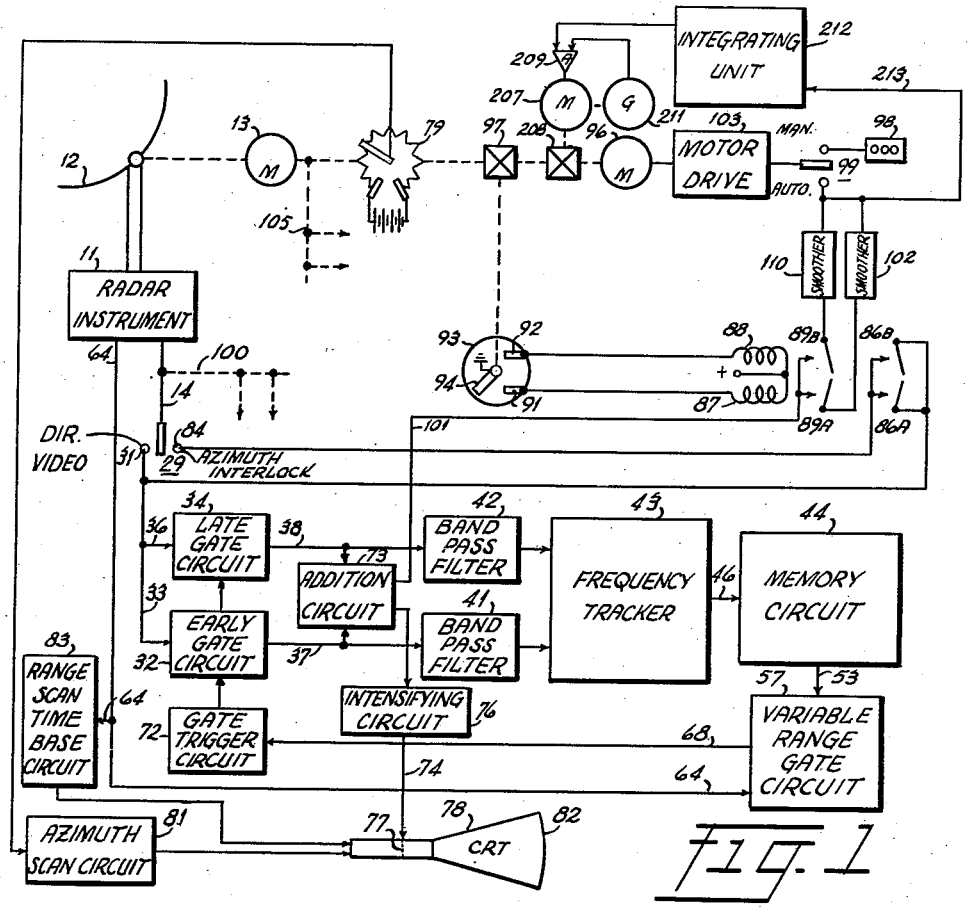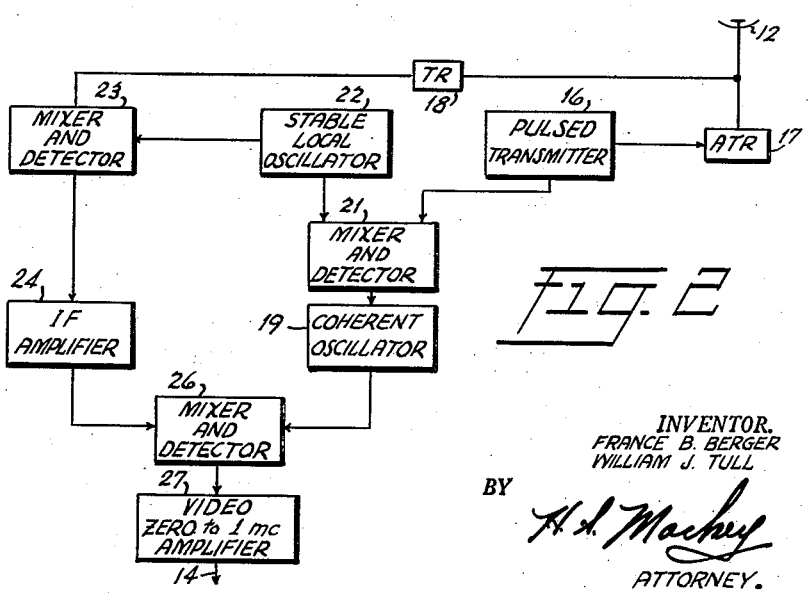

INVENTOR.
FRANCE B BERGER
WILLIAM J TULL
BY
*H. S. Mackey*
ATTORNEY.

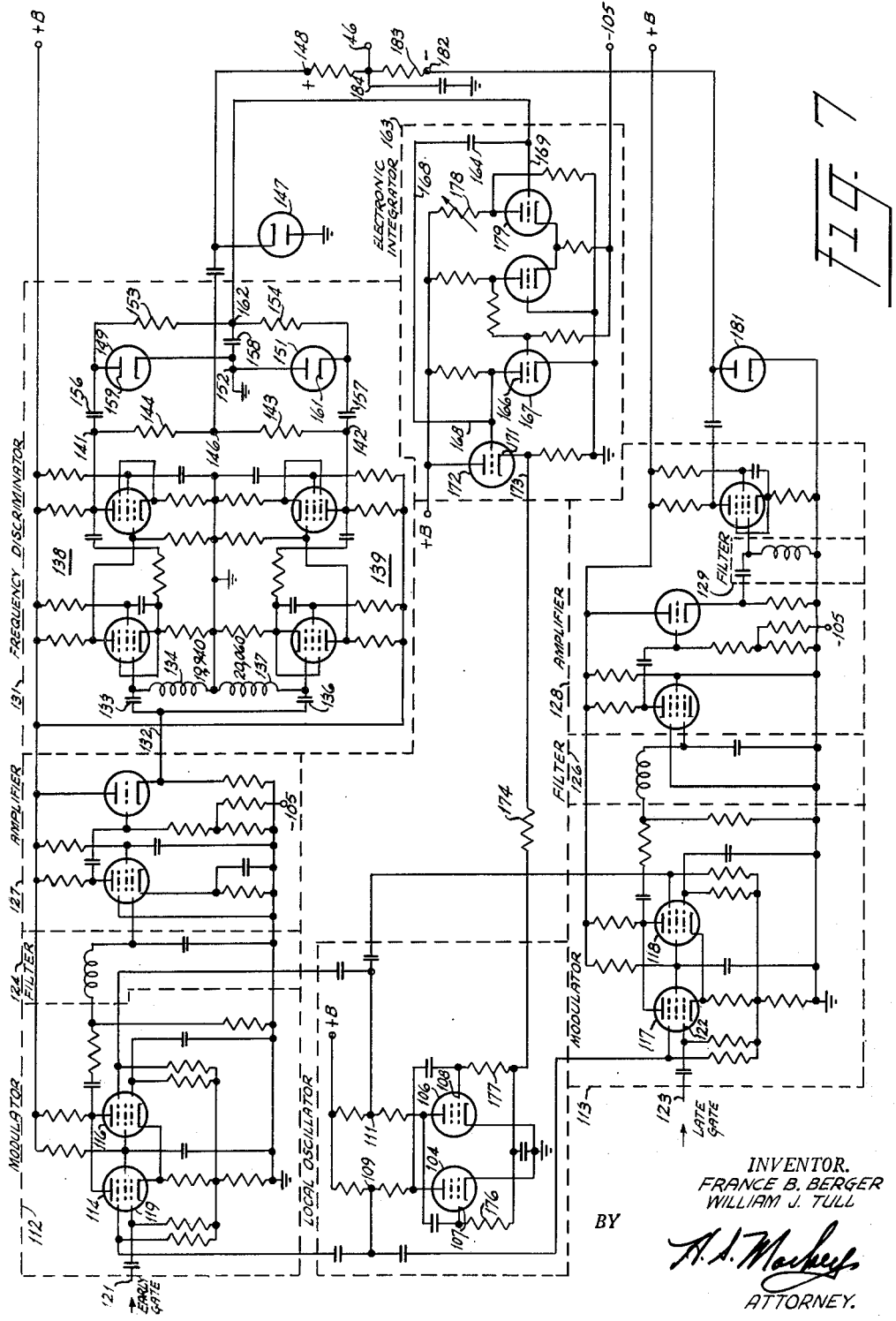

Patented Sept. 7, 1954

2,688,743

UNITED STATES PATENT OFFICE 2,688,743

FREQUENCY TRACKING RADAR

France B. Berger and William J. Tull, Pleasantville, N. Y., assignors to General Precision Laboratory Incorporated, a corporation of New York Application May 29, 1952, Serial No. 290,786

7 Claims. (Cl. 343—7.3)

This invention pertains to radar circuits which track in frequency, and more specifically to radar circuits for measuring the range to a target on a time discrimination basis and in addition employing frequency discrimination to distinguish moving targets from stationary targets and from other targets moving at differing speeds and/or ranges, and to reduce noise.

The invention provides improved means for moving target identification, and involves the automatic tracking of a selected moving target. The invention can be used in search radars as well as in radar circuits having fixed beams, and is applicable to both air-borne and ground radar sets.

The instant invention greatly increases the signal-to-noise ratio of the wanted signal. In so doing, the invention also increases discrimination in favor of moving targets and in addition increases, the effectiveness of automatic tracking over previous methods. Increased circuit performance results from the improved signal-to-noise ratio.

A radar system to which moving target identification is applied may be one which measures the slant range of the target. It may in addition measure other geometrical coordinates of the target, such as azimuth or elevation angle. In such systems the conventional method has been to secure received pulses in such manner as to compare them on a time basis, and to subtract successive pulses one from the other. All microwave echoes reflected from any given stationary target being of the same intensity and occurring at the same time, they cancel, leaving only those echoes representing moving targets. Such discrimination is on the basis of the time of reception of the echoes, that is, only time discrimination is used.

The instant invention also employs time discrimination but in a different manner, and in addition employs frequency discrimination. By frequency discrimination is meant discrimination in accordance with the Doppler frequency, which is defined as the difference between the transmitted and received frequencies. This Doppler difference frequency arises because of relative motion between the radar set and the target, and is a direct measure of the radial component of the velocity of the motion, as is well known. The instant invention not only discriminates against all targets which have no motion relative to the radar transmitter but also against all other targets which have motion but at a different speed giving rise to a Doppler frequency different from that caused by the desired target. This action, in exercising such frequency discrimination, results in a signal-to-noise ratio that is so improved as to constitute a qualitative advance in the art.

The invention, when employed with radars having scanning antennae, contains a memory component, so that as the antenna beam sweeps past the target the receiver "sees" the target and "remembers" its range, its azimuth and/or elevation, its Doppler frequency or speed, and, if desired, other desired quantities until the next sweep of the antenna beam over the target. The advantages of the invention are therefore retained when employed with such scanning radar sets as well as when employed with fixed beam radar sets.

In general, the instant invention includes apparatus for securing a zero time indication at the beginning of each transmitted pulse by a connection between the receiver and the transmitter pulser. The desired target is selected manually, preferably aided by automatic antenna scanning means, and a pip or radar echo from the selected target is received. The radar receiver switches are then changed, and the receiver automatically locks itself to the selected pip and produces a voltage or other indication representing the slant range of the target. Another indication, also automatically locked, may be produced of any other wanted target coordinate characteristic, and although this second indication is not a requisite for the operation of the invention, as a practical matter it is nearly always employed. The invention employs frequency discrimination means including an automatic frequency tracker to measure the Doppler frequency embodied in the wanted signal, and by its use eliminates all other signals having zero Doppler frequency superimposed upon their microwave frequency, and in general eliminates all signals having Doppler frequencies other than that of the wanted signal.

Further understanding of the invention may be secured from the detailed description and the accompanying drawings, in which:

Figure 1 is a general schematic diagram of the invention.

Figure 2 is a diagram of the radar instrument employed by the invention.

Figure 7 is a schematic illustration of the frequency tracker used in the circuit of the invention.

Figure 3:
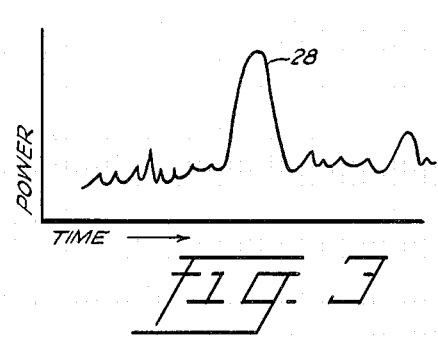
Figures 3, 4 and 5 depict graphs which aid in explaining the mode of operation of the invention.

For purposes of explanation and description, the invention will be herein described in connection with a ground radar instrument having a cathode ray tube display of range and azimuth angle, although as heretofore stated the invention is equally applicable to other types of radar installations. This ground radar instrument is associated with a scanning antenna which continuously rotates in one direction at a fixed speed of 4 revolutions per minute, and emits a vertical fan beam. Such an instrument is suitable for indicating the ranges and azimuths of airplanes in the air within its radius of operation. Being equipped for moving target indication, the instrument reduces ground clutter and all other signals from targets that have no relative or radial motion, and as the set is equipped with an automatic lock facility, it will, after being manually directed to the pip or display indication representing a single specific airplane target, thereafter track that target automatically and will not, with any great intensity at least, display any other target either moving or stationary.

In Fig. 1 the ground radar instrument above mentioned is indicated at 11. Its antenna 12 is continously and steadily rotated through 360° in azimuth by a motor 13 so that the vertical fan beam of the antenna continuously scans surrounding space. The radar set video output is indicated at conductor 14.

The principal parts of a radar instrument that may be employed at 11, Fig. 1, are indicated in Fig. 2, but any other type of radar instrument giving similar output may be equally well employed. The only requirement is that the radar instrument have an output containing Doppler frequencies representative of target speed. A pulsed radar transmitter 16 emits pulses one microsecond in length having a pulse repetition frequency of 10,000 per second. This transmitter is connected to the antenna 12 through an ATR tube 17 and the reflected or echoed radar signal is transmitted to a receiving system through a TR tube 18. A local oscillator 19 coherent (in phase) with the transmitter 16 is employed but, rather than phasing the coherent oscillator 19 directly from the transmitter 16, a portion of the transmitted signal is mixed in a mixer detector 21 with a portion of the output of a stable local oscillator 22 and the difference frequency is employed to phase the coherent oscillator 19. For instance, if the frequency generated by the pulsed transmitter is $f$, the frequency of the stable local oscillator 22 may be $f-30$ mc. so that the difference frequency and that at which the coherent oscillator 19 is operated is 30 mc. A portion of the signal generated by the stable local oscillator 22 is also mixed in another mixer-detector 23 with the receiver or echo signal $f+\Delta f$, in which $\Delta f$ is the increase or decrease in frequency constituting the Doppler frequency, producing a difference frequency of 30 mc. $+\Delta f$. The output of the mixer 23 is amplified in an IF amplifier 24 and is then mixed with the 30 mc. signal generated by the coherent oscillator 19 in a third mixer-detector 26, the difference signal obtained thereby constituting the Doppler shift in frequencies $\Delta f$. The emitted signal contains not only this Doppler frequency but also contains the pulse repetition frequency of 10 kc. etc.

The signal is amplified in a video amplifier 27 that has a pass band extending up to at least one megacycle so that the shapes of the individual pulses and echo details are well preserved. Its video output is plotted in Fig. 3, which represents a time of less than one pulse repetition period. Each vertical projection represents an echo from an object at a distance indicated by its time coordinate, the largest projection 28 representing the echo from a desired target and the smaller projections indicating ground clutter. It is upon the largest projection 28 or received target echo pulse that the radar instrument is manually adjusted by means that will be described later, and to which the instrument is then locked.

The video output of the radar instrument 11, Fig. 1, is led by conductor 14 to the arm of a switch 29. Assuming for the present that the switch 29 is positioned to engage contact 31, the echo signal is impressed on an early gate circuit 32 by means of the connection 3 and a late gate circuit 34 through the conductor 36. The early gate circuit 32 on being triggered in a manner to be described later permits the signal impressed thereon to be transmitted therethrough for a limited period of say two microseconds and at the end of this time triggers the late gate circuit 34 which operates in a similar manner. Thus signals may be transmitted to output conductors 37 and 38 only during very limited and successive periods and the relative amounts of energy in conductors 37 and 38 are directly dependent on the relative amounts of pulse energy existing during the successive gate intervals.

Figure 4:
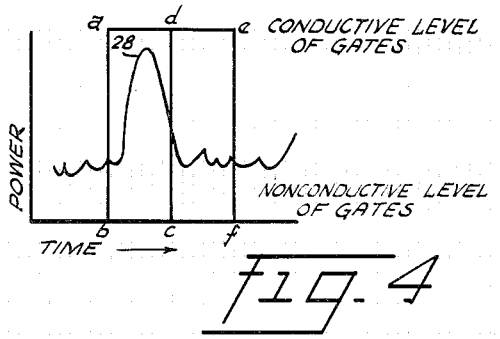

This is illustrated in Fig. 4, in which the rectangle $abcd$ represents the gate of the early gate circuit 32, and the rectangle $cdef$ represents that of circuit 34. The signal pip 28 is superimposed on the gates asymetrically, so that more of its area is in the time of occurrence of the early gate. This represents the condition of more of the signal energy existing in conductor 37, Fig. 1, than in conductor 38. These output energies are passed through two band-pass filters 41 and 42 to remove energy of all frequencies higher than the Doppler frequency which, it is assumed for targets of a particular range of radial velocities, may be from zero to 5000 C. P. S. In particular these filters are required to eliminate the pulse repetition frequency of 10 kc. at this point, and therefore their upper cutoff point is at 7500 cycles. These filters may advantageously have a sharp low cut-off frequency of 100 C. P. S. to reduce or eliminate the effects of ground clutter, however any conventional lowpass filter having a low cut-off of from 10 to 60 C. P. S. may be employed, because the equivalent of this clutter filtering operation is accomplished by a frequency tracker 43.

This component 43 is connected to the filters 41 and 42 for energization by them and automatically tracks or remains tuned to the Doppler frequency, however, it may vary. It contains two separate channels, each respectively energized by the energy passed through the early gate and the late gate, and emits at the output terminal of each channel a direct-current voltage representative of the amounts of energy in the pulses passed through its gate. These voltages are made opposite in sign. When, for instance, the energy in the early gate is greater than that in the late gate, the early gate channel output preponderates, and when less energy is passed through the early gate than through the late gate, the late gate channel output preponderates. These outputs are added in a resistor so that the resistor output terminal has a potential that varies between +50 volts and −50 volts depending on the sense and magnitude of the difference in energy in the gates. The operation of the frequency tracker is more fully described in connection with the overall operation of the frequency tracking radar.

Figure 6:
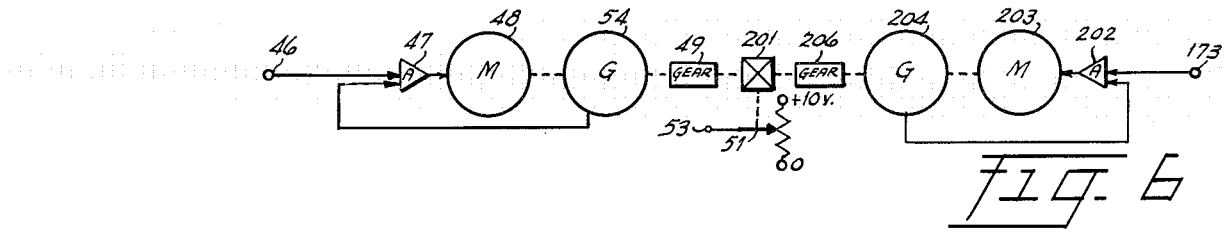
Figure 6 is a schematic diagram of the memory circuit used in the invention.

The frequency tracker 43 is followed by a memory and anticipation circuit 44 which is shown more fully in Fig. 6. The direct-current output potential of the frequency tracker at terminal 46 is amplified by an amplifier 47 to operate a motor 48, the motor speed and direction of rotation being dependent upon the magnitude and polarity of the input voltage at terminal 46. The motor operates a generator 54 and through a gear 49 and differential 201 operates a voltage divider slider 51, so that the position of the slider represents the voltage step applied to the input terminal 46. A negative feedback from the generator 54 linearizes the device. This circuit constitutes a rate servo but because a second feedback loop is provided through the early and late gate circuits its overall action is that of a position servo, and after each passage of the antenna past the target and the consequent motion of the slider 51, this servo input normally falls to zero and its action is to permit the slider 51 to remain stationary until the next passage of the beam across the target. The function of the voltage taken from slider 51 is to correct the range, as will be described later. This action is satisfactory when the target is changing range slowly, but a fast-moving target may move entirely out of the early or late range gate between scans. It is desirable therefore, in order to maintain track of such targets, to add a range rate or anticipation device so that the range correction signal will continue to change at the last known rate of range change between scans. This anticipation device comprises a rate servo consisting of an amplifier 202, a motor 203 and a generator 204 with negative feedback to the amplifier 202. The amplifier excitation may be secured from any point in the circuit where a voltage exists that is or may be made representative of target speed in range, but it is preferred to secure this excitation from the cathode 171 of cathode follower 172 in the electronic integrator 163 shown in Fig. 7. The signal voltage secured at this point is representative of target speed and remains between scans at the magnitude it had at the last scan. The motor 203, Fig. 6, therefore rotates continuously at a speed representative of the target speed in range, and through step-down gearing 206 and differential gear 201 advances the slider 51 at a corresponding rate. This rate of change is superimposed upon the step changes of the other servo including motor 48, but when the target speed in range is constant, after a few scans the rate servo will represent it substantially perfectly, reducing the magnitude of the steps of the step servo to zero.

An alternative method of securing a voltage proportional to target speed in range is to integrate the output of the frequency tracker, which consists of pulses indicating range error. Integration over a period including several antenna scans will result in a quantity representing speed, but this method is inferior to that first described because its output information lags in time.

Figure 8:
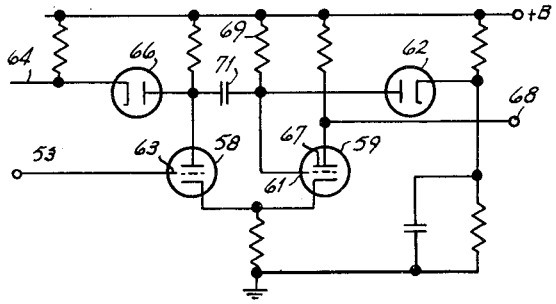
Figure 8 is a schematic diagram of the variable range gate circuit used in the invention.

This voltage output at terminal 53 actuates a variable range gate circuit 57, Fig. 1. This circuit is completely described in vol. 19 of the Radiation Laboratory Series, Waveforms, by Chance et al., on page 168 et seq, and is briefly described as follows:

In Fig. 8 a monostable multivibrator is comprised of two triodes 58 and 59. Triode 59 is normally conducting, the positive potential of its grid 61 being stabilized by the voltage limiter diode 62. The terminal 53 attached to grid 63 represents the same-numbered terminal of Fig. 6, and therefore has a potential varying from zero to +10 volts. This voltage is controlled as before mentioned through the frequency tracker 43, Fig. 1, by the disparity in energy content of those portions of the Doppler return that are respectively in the early and late gates of the gate circuits 32 and 34. The conductor 64, Fig. 8, represents the like-numbered conductor of Fig. 1 and applies through a rectifier 66 negative pulses representing the times of emission of radar transmissions. Such a negative pulse makes the grid 61 negative and tube 59 non-conductive and the consequent dropping cathode potential makes tube 58 conductive. A positive step is thereby generated at the anode 67 and the output terminal 68 attached thereto. The potential of the grid 61 then slowly rises, under control of the time constant of the resistor 69 in combination with the condenser 71, until grid 61 becomes positive enough to make the tube 59 conducting again, closing the anode rectangle with a negative step. It is a characteristic of this circuit that the time duration of the rectangle is linearly proportional to the magnitude of the voltage applied to the grid 63, so that the output voltage at terminal 68 serves as a linear range-time gate.

The trailing edge of this gate is applied to the gate trigger circuit 72, Fig. 1, where it is differentiated and the resulting sharp pulse is applied to start the early gate circuit 32. It is thus triggered at a time representing the range time of the target, and this time is self-correcting, so that as the range of a target changes, the time of triggering of the early gate circuit changes to correspond.

The combined energy output of the two gate circuits is added in the adding circuit 73 and its output, occurring at a time after the transmitted pulse representing the range of the target, continually maintained accurate, is employed to actuate, through the conductor 74 and intensifying circuit 76, the control grid 77 of the cathode ray tube 78 thus displaying on its screen a mark representing the range of the target.

Figure 9:
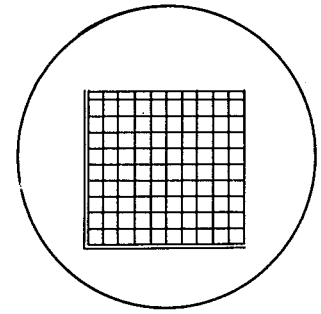
Figure 9 depicts the cathode ray tube screen employed to display output data.

A potentiometer 79 is employed to generate a sawtooth voltage having a magnitude at any instant representative of the antenna azimuth, for operating the azimuth scan of the display. The potentiometer 79 is driven by the antenna motor 13 and its sawtooth voltage output actuates the azimuth scan circuit 81 of a cathode ray tube 78. This tube has a screen 82 shown in more detail in Fig. 9, on which a rectangular coordinate grid is displayed, the abscissae representing antenna azimuth angle and the ordinates representing slant range. This vertical coordinate scan is generated by a time base circuit comprising a sawtooth generator 83, Fig. 1, having a period equal to the maximum range time and producing continuous successive cathode beam vertical scans, the generator 83 being triggered at the start of each transmitted pulse through conductor 64 and the cathode ray tube 78 being intensified at appropriate times by the application to its control grid 77 of a positive pulse derived from an intensifying circuit 76 which in turn is actuated through conductor 74 by the output of the addition circuit 73 as before described.

As so far described, the gate circuits 32 and 34 will have a target signal output only during the sweeping of the target by the antenna beam, which will be during only a few per cent of the total time. During other times noise or other target echoes may actuate the gate circuits and cause unwanted signals. Provision has therefore been made to cut off the radar output while the target is not irradiated by the beam.

The output conductor 14 of the radar instrument 11 is connected to the switch 29 having a "direct video" position 31 for finding the desired target, in which position the switch connects the radar video output directly to the gate circuits. The switch also has a second "azimuth interlock" position, 84, in which position the video output passes through the contacts 86A and 86B of an electromagnetic relay having two coils 87 and 88. The coil 87 actuates contacts 89A and 86A, and the coil 88 actuates contacts 89B and 86B. The two coils are connected for actuation by two segments 91 and 92 of a commutator switch 93 having a grounded rotary arm 94, the arm 94 being rotated by the antenna motor 13. The angular position of the small space between the two segments 91 and 92 represents the position of the antenna in which it irradiates the desired target. This switch position is adjustable by means of a motor 96 actuating a differential gear 97 and manually operable by means of a forward, reverse, and stop pushbutton station 98. Once having set the rotary switch manually to the target azimuth, a switch 99 is turned to "automatic" and the system automatically maintains itself at the target azimuth as follows.

Assume that the relative position of the commutator switch is changed manually until the arm 94 is solely on contact 91 at the time that the antenna 12 points toward the target. The radar return then actuates the gate circuits and the adding circuit 73 and the latter's output through conductor 101 passes through relay contact 89A, which is then in the closed position, into a smoother 102. The smoother integrates the signal received by several antenna cycles, and amplifies the integrated signal to produce a voltage which actuates the motor drive circuit 103 to change the relative phase of the rotary switch 93 in such direction as to bring the switch arm into a position bridging the segments 91 and 92 at the time the antenna points toward the target. If the rotary switch's relative position should drift toward the segment 92 the reverse action occurs through smoother 110 to correct this latter drift.

Thus the two electromagnetic relays are operated through the segments 91 and 92, so that their contacts 89A and 89B are closed only for a short period including the period of target sweep and are open the remainder of the time. The remaining contacts 86A and 86B are also similarly closed and opened, and therefore, when the switch 29 is turned to its azimuth interlock contact 84, the video signal is impressed on the gate circuits only while the antenna is pointing at or near the target, and during the remainder of the time the input to the gate circuits is interrupted, preventing noise and unwanted signals from reaching the gate and succeeding circuits. The circuit of Fig. 1 is thus applicable in tracking a single moving target. However, it may be required to track several targets simultaneously, employing a single radar set and scanning antenna. In order to do this, all other components are duplicated as required, as indicated in Fig. 1 by the dashed branch 100 at the radar set output terminal and the dashed branch 105 at the antenna motor shaft.

The azimuth tracking device, as so far described, has however the disadvantage that if the target moves fast enough in azimuth between the periods of scanning, there will be no signal received from the addition circuit 73 during the times that the relays 87 and 88 are closed, and the automatic azimuth tracking function will fail. In order to overcome this disadvantage a rate servo circuit is added which superimposes a steady tracking rate upon the described step tracking function. This rate servo comprises a motor 207 connected to drive a differential 208 interposed between motor 96 and differential 97. It also includes an amplifier 209, feedback generator 211 and an integrating unit 212. This integrating unit may be of any type, preferably with an effective time constant equal to several antenna scan periods. For example, this unit may be similar to the electronic integrator 163 of Fig. 7, to be described in connection with that circuit. The integrating unit is excited by signals secured through conductor 213 from the combined outputs of the smoothers 102 and 110. Therefore, if these outputs, which have opposite polarity, are equal in their voltage-time integrals, the net effect on the integrator is zero. However, if one is larger than the other an input signal is applied to the integrator which integrates it over several cycles and applies the result, representative of target velocity in azimuth, to the differential 208. Thus the arm 94 of the azimuth stepping device 93 is given a continuous change of rotation by the motor 207 through differential 208, superimposed on the rotation it receives from motor 13, and in addition to the step changes received from motor 96. In this way the azimuth device 93 is caused to anticipate the position of the target in azimuth prior to each scan of the target by the beam. The automatic tracking function is thereby much less likely to be lost than in the absence of the described rate servo.

Figure 5:
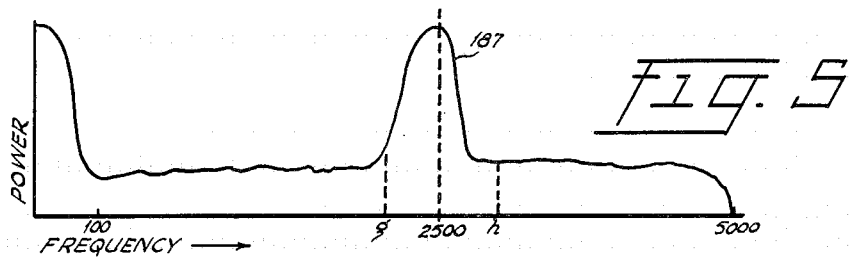

The circuit as heretofore described has a favorable signal-to-noise ratio because the early and late gate circuits exercise time discrimination. That is, in the graphs of Figs. 3 and 4 all received energy outside of the rectangle $abfe$ is excluded, which greatly enhances the ratio of the signal energy represented by the area under the pip 28 to the total energy represented by the area under the entire curve of Fig. 3. If now the energy under the signal pip 28 be inspected from the frequency standpoint, it will be seen that it contains a very large amount of energy that does not contribute to the reception of the wanted intelligence. If a power-frequency characteristic is considered this becomes even more evident as illustrated by Fig. 5 constituting a graph of such characteristic, in which it is assumed that the Doppler return is at a frequency of 2500 C. P. S. The large amount of energy below 100 C. P. S. represents ground clutter and is great enough to interfere very seriously with the operation of apparatus of this character. It sets a very definite and low limit to the range capabilities of such installations. The low power at all frequencies represents true noise, such as shot noise, and although small at any frequency amounts to much in aggregate.

It is a principal objective of this invention to prevent the passage of all energy represented in the graph of Fig. 5 except that between $g$ and $h$, by incorporation of a frequency discrimination device in the circuit.

If the Doppler return were constant in frequency this component could consist merely of a sharply tuned filter, but since the Doppler return in general varies continuously and unpredictably in frequency, this frequency must be automatically followed, and the resonant frequency of the device must be continuously changed to correspond. This is accomplished by the frequency tracker 43, Fig. 1. The specific design of this frequency tracker may be various. For example, it may have various degrees of elaborateness and consequent accuracy, such as by combining the outputs of both an early gate channel and a late gate channel for the purpose of controlling a local oscillator. But for the present purpose a simple operative design is described to avoid unnecessary complication and undue descriptive detail. The circuit of such a simplified frequency tracker is shown in Fig. 7.

In Fig. 7, an oscillator comprising two tetrodes 104 and 106 has an oscillating frequency which is adjustable between 20 kc. and 25 kc. by variation of the bias potential applied to the control grids 107 and 108. The pushpull output energy of the oscillator derived from the two anode resistor intermediate terminals 109 and 111 is coupled to two modulators 112 and 113. Modulator 112 is composed of the pentodes 114 and 116 having anode circuits paralleled, and suppressor grids connected to the oscillator output. Modulator 113 is similar, consisting of the pentodes 117 and 118, with their suppressor grids also connected to the oscillator output. The control grid 119 of the tube 114 is connected by conductor 121 to the band pass filter 41, Fig. 1, so that this modulator 112 is energized by the gate output of the early gate circuit 32. Similarly, the control grid 122 of tube 117 is energized from the late gate circuit 19 through conductor 123. The modulator outputs then contain the modulation products of their inputs, of which only the difference frequency is used. This difference frequency is designed to be 20 kc., the frequency of the oscillator being automatically and continuously adjusted to make the difference 20 kc. in spite of variations of the Doppler frequency. This automatic following of the Doppler frequency as it changes is effected by the remainder of the frequency discriminator in the following manner. The 20 kc. difference frequency is selected, all other modulation products are rejected by 20 kc. series filters 124 and 126, and the selected frequency is amplified by following amplifiers 127 and 128, one located in each of the two channels. These 20 kc. band pass filters 124 and 126 may be as selective or sharp as desired to, say, a band of 100 cycles, and the sharper they are the better signal-to-noise ratio is secured in the final output signal. However, to facilitate adjustment and to maintain high sensitivity while retaining a large signal-to-noise improvement, it is preferred to select a band width of 300 cycles. The late gate amplifier 128 is followed by a second stage of filter 129 to increase the selectivity of its channel to equal that of the early gate channel.

The output of the early gate channel is now automatically sampled to determine whether the frequency is exactly 20 kc. or slightly more or less, by a frequency discriminator 131. The input conductor 132 is connected to two series filters consisting of condenser 133 and inductance 134, and condenser 136 and inductance 137. These filters are tuned respectively below and above 20,000 C. P. S., say to 19,940 C. P. S. and to 20,060 C. P. S. Therefore, if the input energy has the frequency of exactly 20 kc., it will be accepted equally by both series paths and will pass to the following equipment in equal amounts, but if the input energy is at or near 19,940 cycles it will be accepted by the filter of that frequency and will be rejected by the higher frequency filter. Conversely if the input energy is near 20,060 C. P. S. it will be accepted by the higher frequency filter and rejected by the other. Each filter is followed by a two-stage amplifier, 138 and 139, and the amplified outputs are connected to the two terminals 141 and 142 of an adding resistance network 143 and 144. It is therefore obvious that if the frequency is below 20 kc., more alternating current voltage will appear at the terminal 141 than at the terminal 142, while if the frequency is above 20 kc. the reverse will be true, and if the frequency is exactly 20 kc., the alternating current voltage at terminal 141 will exactly equal that at terminal 142.

The center terminal 146 of this adding network is connected through a rectifier tube 147 to an output terminal 148, where a direct current positive voltage appears that is proportional to the alternating current potential between the terminal 146 and ground. This potential is at all times representative of the sum of the potentials of the terminals 141 and 142. These potentials will in general be equal, because of the operation of automatic tracking means. In fact, only momentary deviations from equality will occur, these momentary deviations serving as error signal inputs to the automatic tracking means which are immediately corrected when they arise.

The automatic tracking means consist of a dual demodulator to develop the error signal, and an electronic integrator. The dual demodulator comprises two diode discharge tubes 149 and 151 connected in series aiding between the terminals 141 and 142, with the common terminal 152 grounded. The diodes are shunted by equal resistors 153 and 154, with condensers 156, 157 and 158 inserted to block direct current passage. In operation, with equal alternating potentials existing at the terminals 141 and 142, negative direct current potential accumulates at the anode 159 and an equal positive potential accumulates at the cathode 161. These potentials cause current flow through the equal resistors 153 and 154 so that the potential of their common junction 162 is that of ground. However, when the alternating potential of the terminal 141 is above that of 142, the magnitude of the negative potential on anode 159 is greater than that of the positive potential accumulated on cathode 161, with the result that the junction 162 becomes somewhat negative in potential. Circuit constants are so chosen that unbalance between the terminals 141 and 142 can cause variation of the direct current potential of the terminal 162 from that of ground by as much as 15 volts, either positive or negative, depending upon whether the input potential is above or below 20 kc. in frequency and by how much. A deviation of 60 cycles will, of cource, cause the maximum direct current error voltage output.

The electronic integrator consists of a direct current amplifier 163 having negative voltage feedback through a large condenser 164. The feedback loop is taken from the anode 166 of a final amplifying triode 167, through conductor 168 and the condenser 164, to the input conductor 169 connected to the demodulator output terminal 162. Output potential is taken from the cathode 171 of a final cathode follower tube 172. The feedback loop operates as a Miller feedback, and consequently has a time constant that is very large, being equal to the capacitance of the condenser 164 multiplied by the effective resistance of the resistors 153 and 154 and again multiplied by the gain of the entire electronic integrator exclusive of the output cathode follower. This time constant is made to be of the magnitude of some hundreds of seconds, so that by comparison with expected durations of fluctuations of the frequency tracker input frequency the time constant may well be thought of as infinite. The output voltage in such a Miller feedback amplifier changes proportionately with time, and its speed of change is controlled solely by the magnitudes of the components employed and by the magnitude of the voltage error signal applied at the input conductor 169. In other words, the output voltage change is proportional to the input voltage, or the output voltage is proportional to the integral of the input voltage. It should also be noted that when the input voltage is returned to zero, the output voltage remains at its last-attained level indefinitely, due to the above mentioned long time constant.

This action automatically tracks the input frequency in the following manner. The output conductor 173 of the cathode follower tube 172 is connected through resistors 174, 176 and 177 to the grids 107 and 108 of the oscillator tubes 104 and 106, so that the direct current potential output of the electronic integrator constitutes the "fixed" grid bias potential of the oscillator and as such control the frequency of oscillation thereof. The balancing action causes this frequency of oscillation to be or to tend to become such as when modulated by the input Doppler signal to produce an output of exactly 20 kc. frequency. This frequency is then the exact average frequency emitted by the modulators, and after amplification is also the frequency applied to the resistor terminal 146 and the rectifier 147 in the early gate channel. The frequency in the late gate channel is of course identical.

The normal bias level supplied by the output of the electronic integrator 163 to the local oscillator is manually controllable by a variable anode resistor 178 in the anode circuit of the first tube 179 of the electronic integrator. In spotting a target to be tracked, this resistor 178 is varied until the desired target is found, when it is automatically locked to, and tracked in range as described. During this manual operation the switches 29 and 99, Fig. 1, are kept at the "direct video" and "manual" positions, then put in the "azimuth interlock" and "automatic" positions after the automatic tracking has started.

It is obvious that in place of the manual range search variable resistor 178, an automatic search function may be added by known procedures in effect constantly and automatically varying the output of tube 179 until a target is picked up and energy is emitted by the two channels of the frequency tracker, when the automatic variation of the output of tube 179 is discontinued.

The late gate channel tuned amplifier 128, Fig. 7, is followed by a rectifier tube 181 and output terminal 182 at which a direct current negative output potential appears. This negative output potential is exactly equal to the positive output potential at terminal 148 when the energies in the early and late gates are equal. When that in the early gate preponderates, the positive potential at terminal 148 is greater than the negative potential at terminal 182. On the other hand, when the late gate energy preponderates, the negative potential of terminal 182 will be greater than the positive potential of terminal 148.

The direct-current potentials of opposite sign at the terminals 148 and 182 are subtracted by a center-tapped resistor 183, and are integrated by a large condenser 184. Therefore the output of the center tap at terminal 46 consists of a direct-current voltage that may have any value within desired limits above and below zero. It may, for example reach +50 volts representing maximum preponderance of the early gate channel energy over that of the late gate, or −50 volts representing the reverse condition. This voltage at terminal 46 is applied to the memory circuit, as was described in connection with Figs. 1 and 6.

Figure 5 is a frequency versus energy representation of the energy applied through the early and late gates, as before stated. When energy is passed through the two band pass filters 41 and 42, Fig. 1, the upper limit of frequency is restricted to somewhat above 5000 cycles and the lower limit is placed between 50 and 100 cycles. In Fig. 5, the energy below 100 cycles represents principally ground clutter, and this is largely eliminated by the filters 41 and 42, Fig. 1. What remains is eliminated in the frequency tracker 43, Fig. 1 when the projection 187, Fig. 5, between $g$ and $h$ representing the frequencies present in the Doppler return is beat to 20 kc. by subtraction from the frequency of the oscillator, and is passed through narrow band filters. As a result, the energy zone between $g$ and $h$ in Fig. 5 which represents a band width of 300 cycles, is the only energy effective at the output terminals of the frequency tracker, and all of the remaining energy depicted in this graph has been eliminated, greatly improving the signal-to-noise ratio of the frequency tracking radar.

It is obvious that the outputs of the two similar modulators 112 and 113, Fig. 7, may contain a whole additional series of frequencies representing the sums and differences of harmonics of the pulse repetition frequency interacting with harmonics and the fundamental of the Doppler frequency. In order to utilize the energy contained in the major frequencies of this series, it would be necessary to increase the upper cut-off frequency points of the two band-pass filters 41 and 42, Fig. 1, to include these frequencies, and to furnish an additional set of filters for each such major frequency.

What is claimed is:

1. In a pulse-echo object locating system of the character described wherein echoes from an object desired to be located provide pulses whose frequency of oscillations differ from the frequency of oscillations of pulses received from other objects, the combination of means for deriving signals from received echo pulses which have frequencies dependent on the characteristic oscillation frequencies of said echo pulses, a pair of gate circuits operative to admit signals only during successive limited intervals of time, means operative in accordance with the relative amounts of signal energy derived from the pulse echoes of said object to be located and admitted by the respective gate circuits for determining their time of operation, an oscillator producing an output signal, mixer means having impressed thereon the signal transmitted by said gate circuits and said oscillator output signal producing a beat frequency signal therefrom, frequency discriminatory means having said beat frequency signal impressed thereon and transmitting only a limited band of said beat frequency signal, and means operative by the output of said frequency discriminatory means for varying the frequency of the signal generated by said oscillator in a direction to compensate for variation in frequency of the signal transmitted by said gate circuits.

2. In a pulse-echo object locating system of the character described wherein echoes from an object desired to be located provide pulses whose frequency of oscillations differ from the frequency of oscillations of pulses received from other objects, the combination of means for deriving signals from received echo pulses which have frequencies dependent on the characteristic oscillation frequencies of said echo pulses, a pair of gate circuits operative to admit signals only during successive limited intervals of time, means operative in accordance with the relative amounts of signal energy derived from the pulse echoes of said object to be located and admitted by the respective gate circuits for determining their time of operation, an oscillator producing an output signal, mixer means having impressed thereon the signal transmitted by said gate circuits and said oscillator output signal producing therefrom a beat frequency signal, a filter transmitting only a narrow band of said beat frequency signal, a first amplifier having an input circuit tuned to frequencies above the medial frequency of said band, a second amplifier having an input circuit tuned to frequencies below the medial frequency of said band, and means operative by the relative amounts of signal energy transmitted by said first and second amplifiers for controlling the frequency of the signal generated by said oscillator.

3. In a pulse-echo object locating system of the character described wherein pulse echo signals received from an object desired to be located are distinguishable from pulse echo signals received from other objects by their unique Doppler shift in frequency, the combination of means for deriving video signals, the frequency of which is representative of said Doppler shift in frequency, from said pulse echo signals, gate circuit means for admitting said video signals only during limited time intervals, means for transmitting only a restricted band of frequencies of the video signals admitted by said gate circuit means, means for varying the band of frequencies transmitted dependent on the frequency of said video signals, means for deriving a control signal from said restricted video frequency band, and means operated by said control signal for determining the time of operation of said gate circuit means.

4. In a pulse-echo object locating system of the character described wherein pulse echo signals received from an object desired to be located are distinguishable from pulse echo signals received from other objects by their unique Doppler shift in frequency, the combination of means for deriving video signals, the frequency of which is representative of said Doppler shift in frequency, from said pulse echo signals, gate circuit means for admitting said video signals only during limited time intervals, an oscillator, mixer means having impressed thereon the output of said oscillator and the signals transmitted by said gate circuit means producing therefrom a beat frequency signal, frequency discriminatory means having said beat frequency signal impressed thereon and transmitting only a limited band of said beat frequency signals, means operative by the output of said frequency discriminatory means for varying the frequency of the signal generated by said oscillator to maintain said beat frequency constant, means operative by the output of said discriminatory means for producing a control signal, and means operative by said control signal for determining the time of operation of said gate circuit means.

5. In a pulse-echo object locating system of the character described wherein pulse echo signals received from an object desired to be located are distinguishable from pulse echo signals received from other objects by their unique Doppler shift in frequency, the combination of means for deriving video signals, the frequency of which is representative of said Doppler shift in frequency, from said pulse echo signals, a pair of gate circuits operative to admit signals only during successive limited intervals of time, means for transmitting only a restricted band of frequencies of the video signals admitted by said respective gate circuits, means for varying the band of frequency transmitted dependent on the frequency of the video signal, means for deriving a control signal from the comparison of the restricted bands of frequencies derived from the respective gate circuits, and means operative by said control signal for determining the time of operation of said gate circuits.

6. In a pulse-echo object locating system of the character described wherein pulse echo signals received from an object desired to be located are distinguishable from other pulse echo signals received from other objects by their unique Doppler shift in frequency, the combination of means for deriving video signals, the frequency of which is representative of said Doppler shift in frequency, from said pulse echo signals, a pair of gate circuits operative to admit signals only during successive limited intervals of time, a pair of transmission circuits connected to the respective outputs of each of said gate circuits, each of said transmission circuits containing a modulator, a single oscillator having its output impressed on each of said modulators whereby beat frequency signals are obtained from the outputs of each of said modulators, filter means in each of said transmission circuits for transmitting only a narrow band of said beat frequency signals, a frequency discriminator in one of said transmission circuits, means for controlling the frequency of said single oscillator by the output of said frequency discriminator, means for comparing the amplitudes of the narrow band of signals transmitted by each of said transmission circuits and for producing a control signal from such comparison, and means operative by said control signal for determining the time of operation of said gate circuits.

7. A pulse-echo object locating system as set forth in claim 6 having a rotating directional antenna for receiving said pulse echo signals and being provided with means for inhibiting the transmission of said pulse echo signals except during intervals that said antenna is directed towards the object desired to be located.

References Cited in the file of this patent

UNITED STATES PATENTS

| Number | Name | Date |
|---|---|---|
| 2,467,319 | King et al. | Apr. 12, 1949 |
| 2,516,356 | Tull et al. | July 25, 1950 |
| 2,544,293 | Braden | Mar. 6, 1951 |
| 2,629,864 | Parzen | Feb. 24, 1953 |